United States Patent
Kostic et al.

(10) Patent No.: US 11,031,026 B2
(45) Date of Patent: Jun. 8, 2021

(54) ACOUSTIC ECHO CANCELLATION DURING PLAYBACK OF ENCODED AUDIO

(71) Applicant: QUALCOMM Incorporated, San Diego, CA (US)

(72) Inventors: Andrew Kostic, Woodbridge (CA); Eddie Choy, Carlsbad, CA (US); Dinesh Ramakrishnan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 103 days.

(21) Appl. No.: 16/219,620

(22) Filed: Dec. 13, 2018

(65) Prior Publication Data
US 2020/0194019 A1  Jun. 18, 2020

(51) Int. Cl.
| | |
|---|---|
| *G10L 21/00* | (2013.01) |
| *G10L 25/84* | (2013.01) |
| *G10L 25/78* | (2013.01) |
| *G10L 21/0208* | (2013.01) |
| *G10L 21/028* | (2013.01) |
| *G10L 21/0364* | (2013.01) |
| *G10L 21/0216* | (2013.01) |

(52) U.S. Cl.
CPC ........ *G10L 21/0208* (2013.01); *G10L 21/028* (2013.01); *G10L 21/0364* (2013.01); *G10L 2021/02082* (2013.01); *G10L 2021/02166* (2013.01)

(58) Field of Classification Search
CPC ................................ G06F 13/28; G10L 25/48
See application file for complete search history.

(56) References Cited

U.S. PATENT DOCUMENTS

| | | | | |
|---|---|---|---|---|
| 6,816,592 | B1* | 11/2004 | Kiria | H04B 3/23 370/289 |
| 7,558,729 | B1* | 7/2009 | Benyassine | G10L 25/48 370/286 |
| 2002/0041678 | A1* | 4/2002 | Basburg-Ertem | H04B 3/23 379/406.01 |
| 2005/0055116 | A1* | 3/2005 | Isaka | G10L 21/0208 700/94 |

(Continued)

FOREIGN PATENT DOCUMENTS

| | | |
|---|---|---|
| EP | 2685700 A1 | 1/2014 |
| WO | 2017105998 A1 | 6/2017 |

OTHER PUBLICATIONS

International Search Report and Written Opinion—PCT/US2019/066025—ISA/EPO—dated Apr. 6, 2020 (12 pp.).

*Primary Examiner* — Shreyans A Patel

(74) *Attorney, Agent, or Firm* — Moore IP

(57) ABSTRACT

Methods, systems, computer-readable media, and apparatuses for acoustic echo cancellation during playback of encoded audio are presented. In some embodiments, a decoder is arranged to decode an encoded media signal to produce an echo reference signal, and an echo canceler is arranged to perform an acoustic echo cancellation operation, based on the echo reference signal, on an input voice signal to produce an echo-cancelled voice signal. The echo canceler may be configured to reduce, relative to an energy of a voice component of the input voice signal, an energy of a signal component of the input voice signal that is based on audio content from the encoded media signal.

20 Claims, 10 Drawing Sheets

(56) References Cited

U.S. PATENT DOCUMENTS

| | | | |
|---|---|---|---|
| 2007/0189507 A1* | 8/2007 | Tittle ................... | H04M 9/082 379/406.01 |
| 2011/0235500 A1* | 9/2011 | Shenoi ................. | H04J 3/0632 370/201 |
| 2015/0086005 A1* | 3/2015 | Kechichian ........... | H04M 9/082 379/392.01 |
| 2016/0306758 A1* | 10/2016 | Lu .......................... | G06F 13/28 |

* cited by examiner

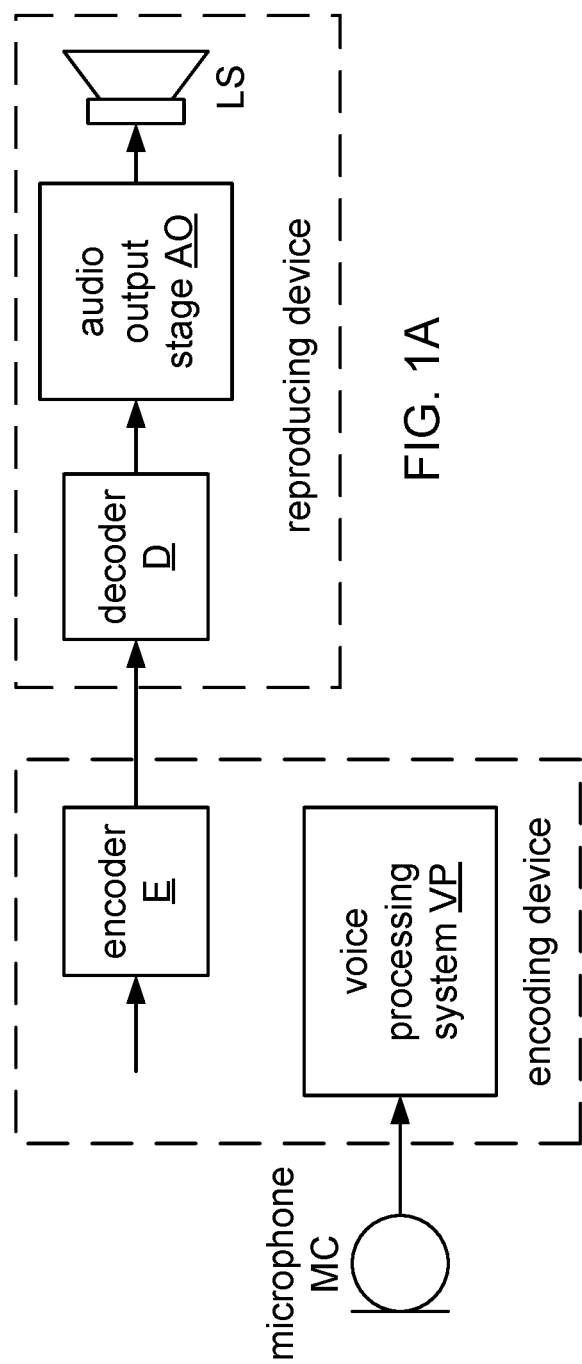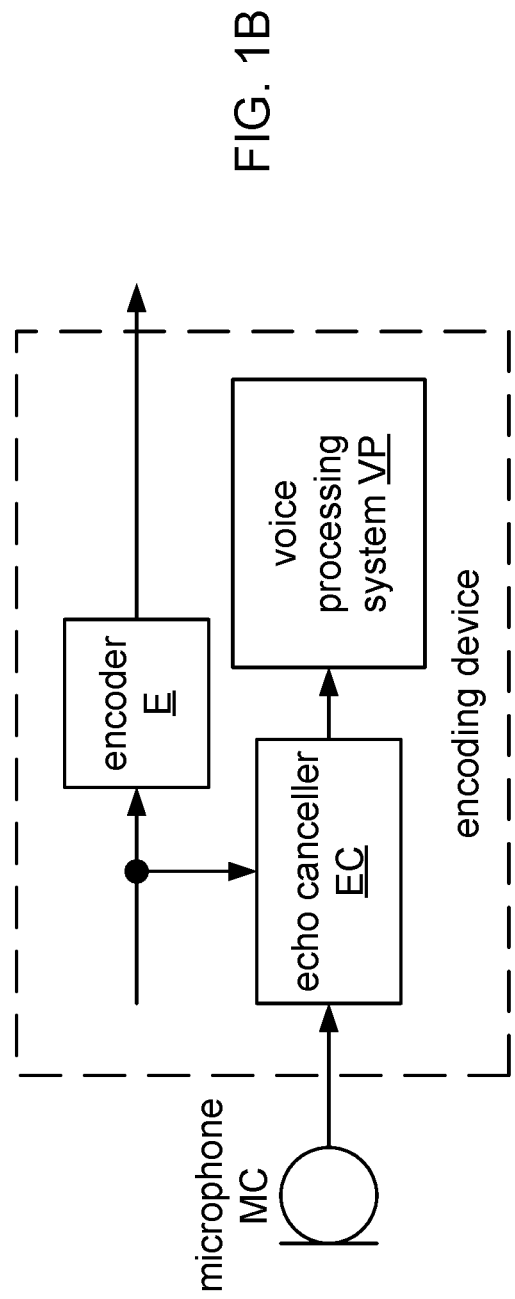

ACOUSTIC ECHO CANCELLATION DURING PLAYBACK OF ENCODED AUDIO

FIELD OF THE DISCLOSURE

Aspects of the disclosure relate to echo cancellation.

BACKGROUND

Widespread adoption of short-range wireless protocols has led to the development of consumer devices that encode audio signals for wireless transmission to a nearby device for reproduction. The Bluetooth® protocol (as specified by the Bluetooth Special Interest Group (SIG), Kirkland, Wash.) is an example of a short-range wireless protocol that supports such applications.

FIG. 1A shows a block diagram of an encoding device in communication with a reproducing device. The encoder E of the encoding device encodes a digital media signal that carries audio content (e.g., speech and/or music). The reproducing device receives the encoded signal (e.g., wirelessly) from the encoding device, and decoder D decodes the received encoded signal to produce an audio output signal, which is processed by an audio output stage AO and reproduced by a loudspeaker LS. The reproducing device may receive the encoded digital signal via a Bluetooth® connection, for example. In one common scenario, the reproducing device is an audio system (e.g., an infotainment system) of an automobile or other vehicle, and the encoding device is a smartphone of an occupant of the vehicle. In another common scenario, the encoding device is a smartphone and the reproducing device is a sound bar or other home audio system.

The encoding device shown in FIG. 1A also includes a voice processing system VP that receives voice input from a user of the device via a microphone MC. Voice processing system VP may be configured, for example, to produce voice output for cellular telephony. In another example, voice processing system VP may be configured to produce voice output to a speech recognition system. In either case, microphone MC may also pick up, in addition to the voice input, content from the digital media signal as reproduced by loudspeaker LS, which may be undesirable for input to voice processing system VP.

FIG. 1B shows a block diagram of an encoding device equipped with an echo canceler EC. The echo canceler EC receives the digital media signal as an echo reference signal and performs an acoustic echo cancellation operation to cancel the content from the digital media signal from the microphone signal before it is provided to the voice processing system VP.

BRIEF SUMMARY

An apparatus according to a general configuration includes an encoder arranged to encode a digital media signal to produce an encoded media signal; a decoder arranged to decode the encoded media signal to produce an echo reference signal; and an echo canceler arranged to perform an acoustic echo cancellation operation, based on the echo reference signal, on an input voice signal to produce an echo-cancelled voice signal. In this apparatus, the echo controller is configured to reduce, relative to an energy of a voice component of the input voice signal, an energy of a signal component of the input voice signal that is based on audio content from the encoded media signal.

A method according to a general configuration includes encoding a digital media signal to produce an encoded media signal; decoding the encoded media signal to produce an echo reference signal; and, based on the echo reference signal, performing acoustic echo cancellation on an input voice signal to produce an echo-cancelled voice signal. In this method, the input voice signal includes a voice component and a signal component that is based on audio content from the encoded media signal, and an energy of the voice component, relative to an energy of the signal component that is based on audio content from the encoded media signal, is greater in the echo-cancelled voice signal than in the input voice signal. Computer-readable storage media comprising code which, when executed by at least one processor, causes the at least one processor to perform such a method are also disclosed.

BRIEF DESCRIPTION OF THE DRAWINGS

Aspects of the disclosure are illustrated by way of example. In the accompanying figures, like reference numbers indicate similar elements.

FIG. 1A shows a block diagram of an encoding device in communication with a reproducing device;

FIG. 1B shows a block diagram of an encoding device equipped with an echo canceler;

DETAILED DESCRIPTION

Figure 2A:
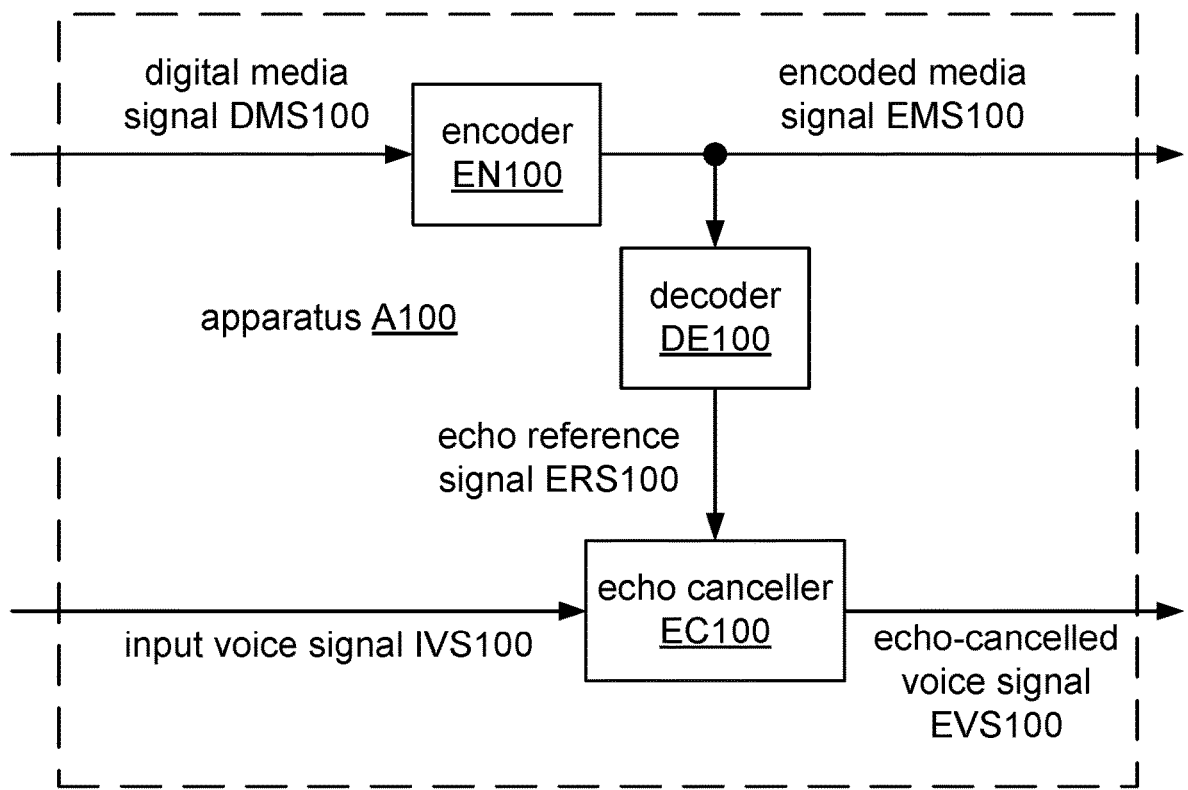
FIG. 2A shows a block diagram of an apparatus A100 according to a general configuration.

A lossy encoding scheme may greatly compress the data bandwidth of a signal while having a much smaller comparative effect on perceptual quality. It may be desirable to encode a digital audio signal using a lossy audio encoding scheme so that, for example, the encoded audio signal may be transmitted into a limited-bandwidth channel. In absolute terms, however, the decoded audio signal may differ significantly from the original digital audio signal. Current implementations of lossy audio encoding schemes are typically based on psychoacoustic principles, and differences between the source audio signal and the decoded audio signal may arise, for example, from non-linear processing operations in the codec (e.g., omission of components of the source audio signal that are determined to be masked in time and/or frequency). Such differences may cause an acoustic echo cancellation operation as described above with reference to FIG. 1B to produce an echo-cancelled signal that includes artifacts which may interfere with subsequent communications and/or processing operations. Systems for keyword detection and/or automatic speech recognition (ASR), for example, may have difficulty handling ambient noise including these artifacts, and their presence may cause the system to misrecognize or fail to recognize a command by a user of the system.

This disclosure includes descriptions of systems, methods, apparatus, and computer-readable media for processing of an input audio signal to cancel acoustic echo relating to reproduction of an encoded audio signal. Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. The term "signal component" is used to indicate a constituent part of a signal, which signal may include other signal components. The term "audio content from a signal" is used to indicate an expression of audio information that is carried by the signal.

FIG. 2A shows a block diagram of an apparatus A100 according to a general configuration that includes an encoder EN100, a decoder DE100, and an echo canceler EC100. In this apparatus, encoder EN100 is arranged to encode a digital media signal DMS100 to produce an encoded media signal EMS100, decoder DE100 is arranged to decode encoded media signal EMS100 to produce an echo reference signal ERS100, and echo canceler EC100 is arranged to perform an acoustic echo cancellation operation, based on echo reference signal ERS100, on an input voice signal IVS100 to produce an echo-cancelled voice signal OAS100.

Digital media signal DMS100 may be a PCM (pulse-code-modulated) signal. In a typical application of apparatus A100, digital media signal DMS100 is an LPCM (linear PCM) signal. Typical sampling rates for digital media signal DMS100 include 44.1 kHz, 48 kHz, and 96 kHz, and typical resolutions for digital media signal DMS100 include 16 bits and 24 bits. Digital media signal DMS100 may have one channel (e.g., monophonic), two channels (e.g., stereophonic), or a greater number of channels (e.g., for 5.1 surround sound or another multichannel format).

Encoder EN100 may be configured to perform a lossy compression operation on digital media signal DMS100 to produce encoded media signal EMS100. For example, EN100 may be configured to encode signal DMS100 according to a codec that is applicable to Bluetooth® transmission by a source device within the Advanced Audio Distribution Profile (A2DP) (e.g., as specified by the Bluetooth Special Interest Group (SIG) (Kirkland, Wash.) in Advanced Audio Distribution Profile Specification V13, dated Jul. 24, 2012 (AADP_SPEC)). Examples of such codecs include any of the following:

Low Complexity Subband Coding (SBC, e.g. as defined in AADP-SPEC);

aptX, aptX-LL, and aptX HD (QUALCOMM Inc., San Diego, Calif.);

MPEG-1 Part 3 and MPEG-2 Part 3 (e.g. as defined in International Organization for Standardization/International Electrotechnical Commission (ISO/IEC) 11172-3:1993 and 13818-3:1998, respectively);

Advanced Audio Coding (AAC) and High-Efficiency AAC (HE-AAC, also known as AAC+) (e.g. as defined in ISO/IEC 14496-3:2009);

HE-AAC v2 (e.g., as defined in European Telecommunications Standards Institute Technical Specification (ETSI TS) 126 401 V6.1.0 (December 2004));

Adaptive Transform Acoustic Coding (ATRAC) and LDAC (Sony Corp., Tokyo, JP); and Ultra High Quality (UHQ)-BT (Samsung Electronics Co., Ltd., Suwon, KR). Encoder EN100 may be implemented to be configurable (e.g., via a user interface) to use a codec, from among a plurality of available codecs, that corresponds to a user selection (e.g., aptX for a user selection of 'Standard', and aptX HD for a user selection of 'High Quality').

Decoder DE100 may be configured to produce echo reference signal ERS100 by performing a decoding operation on encoded media signal EMS100 that is complementary to the encoding operation performed by encoder EN100. For example, encoder EN100 and decoder DE100 may comply with corresponding parts of the same codec specification. Echo reference signal ERS100 may have the same format as digital media signal DMS100. Alternatively, echo reference signal ERS100 may have a different sampling rate (e.g., a lower sampling rate), a different bit resolution (e.g., a lower bit resolution), and/or a different number of channels (e.g., fewer channels) than digital media signal DMS100.

As a result of the lossy compression operation, echo reference signal ERS100 may be expected to differ from digital media signal DMS100 (e.g., due to artifacts introduced by encoder EN100 and/or decoder DE100). Echo canceler EC100 is arranged to perform an acoustic echo cancellation operation, based on echo reference signal ERS100, on input voice signal IVS100 to produce echo-cancelled voice signal EVS100. Echo controller EC100 is configured to reduce, relative to an energy of a voice component of input voice signal IVS100, an energy of a signal component of input voice signal IVS100 that is based on audio content from encoded media signal EMS100. In a typical use case, the voice component of input voice signal IVS100 is a user's voice, and the signal component of input voice signal IVS100 that is based on audio content from encoded media signal EMS100 is produced by a reproducing device (e.g., a Bluetooth® sink) that receives encoded media signal EMS100 wirelessly and decodes it to reproduce its audio content (e.g., music or speech) via one or more loudspeakers.

Echo canceler EC100 may be configured to apply echo reference signal ERS100 as a reference signal. Echo canceler EC100 may be configured to implement, for example, a least-mean-squares (LMS) algorithm (e.g., filtered-reference ("filtered-X") LMS, subband LMS, normalized LMS (NLMS), block NLMS, step size NLMS, etc.). Echo canceler EC100 may be implemented, for example, as a feed-forward system. Echo canceler EC100 may be implemented to include one or more other features as known in the art of echo cancelers, such as, for example, double-talk detection (e.g., to inhibit filter adaptation while the user is speaking).

Figure 2B:
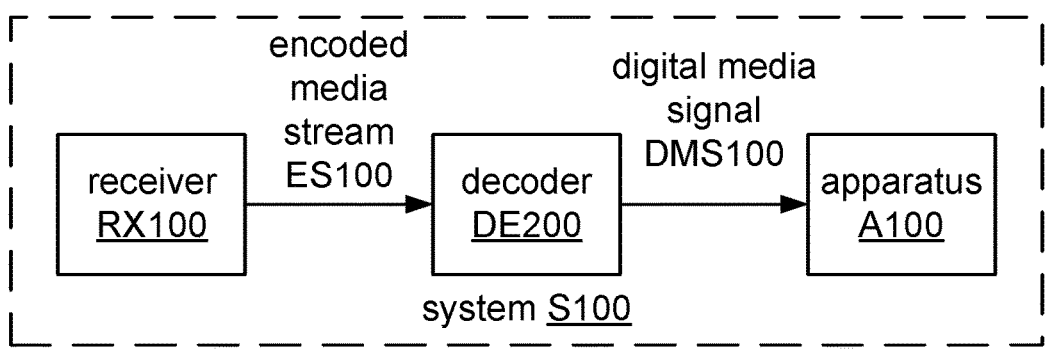
FIG. 2B shows a block diagram of a system S100 that includes a receiver RX100, a decoder DE200, and an instance of apparatus A100.

In some applications, digital media signal DMS100 is obtained by decoding an audio stream received wirelessly (for example, via cellular telephony, satellite radio, or a local-area wireless network). FIG. 2B shows a block diagram of such a system S100 that includes a receiver RX100, a decoder DE200, and an instance of apparatus A100. Receiver RX100 is configured to process a radio-frequency signal to produce an encoded media stream ES100. For example, receiver RX100 may be implemented as a receiver for cellular telephony, for satellite radio, and/or for wireless networking (e.g., Wi-Fi as specified in Institute of Electrical and Electronics Engineers (IEEE) Standard 802.11-2012, Piscataway, N.J.).

Figure 2C:
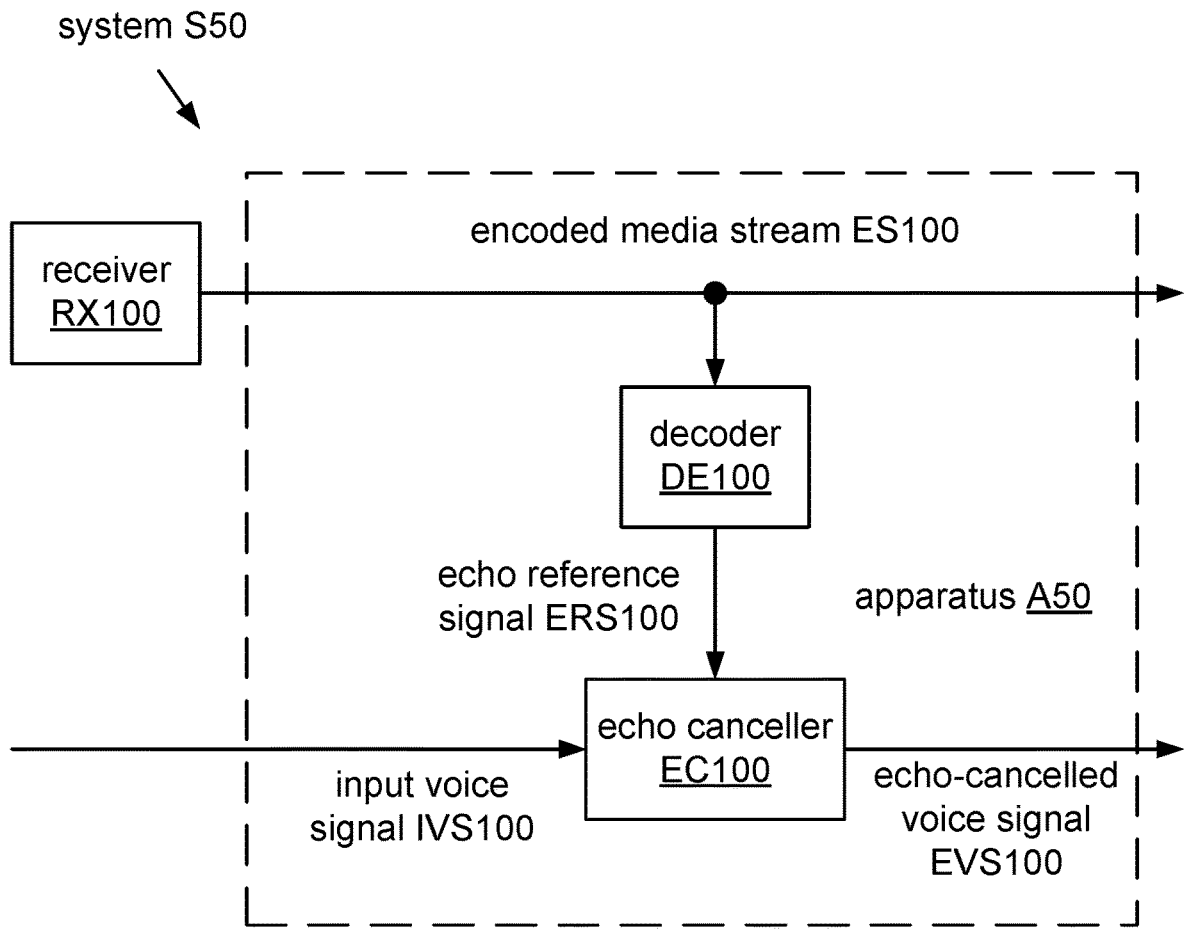
FIG. 2C shows a block diagram of a system S50 that includes an instance of receiver RX100 and an instance of an apparatus A50 according to a general configuration.

Decoder DE200 may be implemented to decode encoded media stream ES100 according to a codec that is applicable for the particular streaming service (e.g., aptX, AAC, HE-AAC, HE-AAC+ v2, MPEG). In a further example as shown in FIG. 2C, encoded media stream ES100 is encoded using a codec that is applicable to Bluetooth® transmission. In this case, apparatus A100 may be implemented without including an instance of encoder EN100 as apparatus A50, and system S100 may be implemented without including an instance of decoder DE200 as system S50. System S50 may also be implemented to include a transmitter (e.g., an instance of transmitter TX100 as described herein) to operate as a Bluetooth® source by retransmitting encoded media stream ES100, and it is further noted that apparatus A50 may replace apparatus A100 in any of the systems described below (e.g., systems S150, S200, S300, S350, S400, S410, S420, S430, S450, S500, S520), with encoded media stream ES100 substituting for encoded media signal EMS100.

Figure 2D:
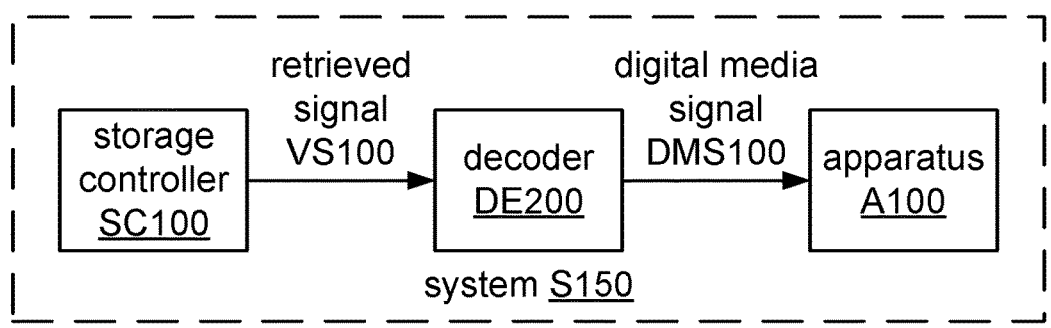
FIG. 2D shows a block diagram of a system S150 that includes a storage controller SC100, decoder DE200, and an instance of apparatus A100.

Alternatively or additionally, digital media signal DMS100 may be obtained from storage (e.g., from memory within the same device that includes apparatus A100). FIG. 2D shows a block diagram of a system S150 that includes a storage controller SC100, decoder DE200, and an instance of apparatus A100. Storage controller SC100 may be configured to produce retrieved signal VS100 from a selected file in storage, such as volatile memory (e.g., dynamic random-access memory (RAM) or DRAM) or nonvolatile memory (e.g., flash RAM), which may be within the same device as apparatus A100 (e.g., on the same printed circuit board or even on the same chip). Retrieved signal VS100 may contain audio content encoded in, for example, any of the codecs mentioned herein. In another example, retrieved signal VS100 contains audio content encoded in a lossless codec, such as MPEG-4 Scalable to Lossless (SLS) or Free Lossless Audio Codec (FLAC, Xiph.org, Somerville, Mass.). In a further example, retrieved signal VS100 may be in an uncompressed form suitable as digital media signal DMS100 (e.g., from a file in Waveform Audio File Format or WAV), so that decoder DE200 may be bypassed or omitted.

Figure 3A:
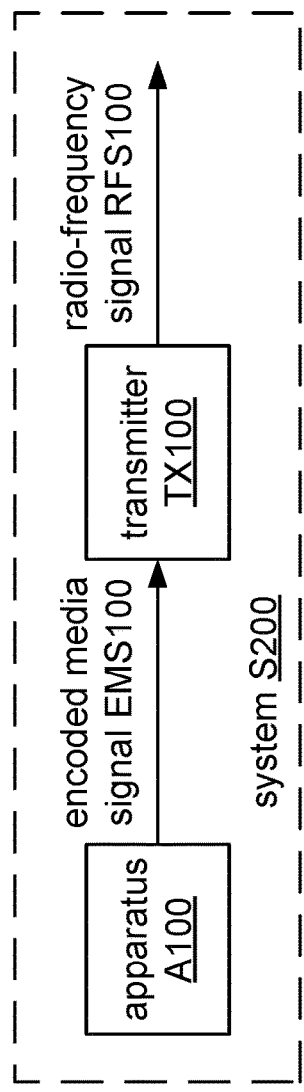
FIG. 3A shows a block diagram of a system S200 that includes a transmitter TX100 and an instance of apparatus A100.

As noted above, it may be desirable to implement apparatus A100 within a source device, such as a device operable as a Bluetooth® source. FIG. 3A shows a block diagram of a system S200 that includes an instance of apparatus A100 and a transmitter TX100 that is arranged to produce a radio-frequency signal RFS100 (e.g., for wireless transmission via one or more antennas) that is based on encoded media signal EMS100. In this case, the signal component of input voice signal IVS100 that is based on audio content from encoded media signal EMS100 is also based on audio content from radio-frequency signal RFS100. Transmitter TX100 may be implemented to perform one or more additional operations associated with a particular transmission protocol (e.g., packetization). For example, transmitter TX100 may be configured to produce signal RFS100 in compliance with a Bluetooth® A2DP as specified in, e.g., AADP_SPEC. Radio-frequency signal RFS100 may include other information, such as one or more remote control commands, which may relate to reproduction of the decoded audio content by the reproducing device (e.g., volume, balance). In one such example, transmitter TX100 is also configured to produce signal RFS100 in compliance with a Bluetooth® Audio/Video Remote Control Profile (AVRCP) (e.g., as specified by the Bluetooth SIG in Audio/Video Remote Control Profile v1.6.1, dated Dec. 15, 2015 (AVRCP SPEC)). In another example, transmitter TX100 may be configured to produce signal RFS100 in compliance with a Wi-Fi protocol (e.g., as specified in Institute of Electrical and Electronics Engineers (IEEE) Standard 802.11-2012, Piscataway, N.J.).

Figure 3B:
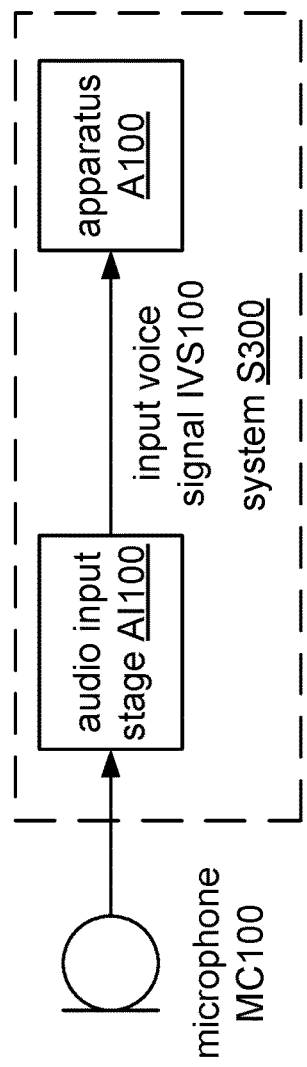
FIG. 3B shows a block diagram of a system S300 that includes an audio input stage AI100 and an instance of apparatus A100.

FIG. 3B shows a block diagram of a system S300 that includes an instance of apparatus A100 and an audio input stage AI100 that receives input from a microphone MC100. The various types of microphone that may be used for microphone MC100 include (without limitation) piezoelectric microphones, dynamic microphones, electret microphones, and microelectro-mechanical systems (MEMS) microphones. Audio input stage AI100 may perform one or more operations on an output signal that is produced by microphone MC100 in response to sensed air pressure variations, such as, for example, analog-to-digital conversion (e.g., sampling), preamplification, automatic gain control (AGC), and/or high-pass filtering.

Figure 3C:
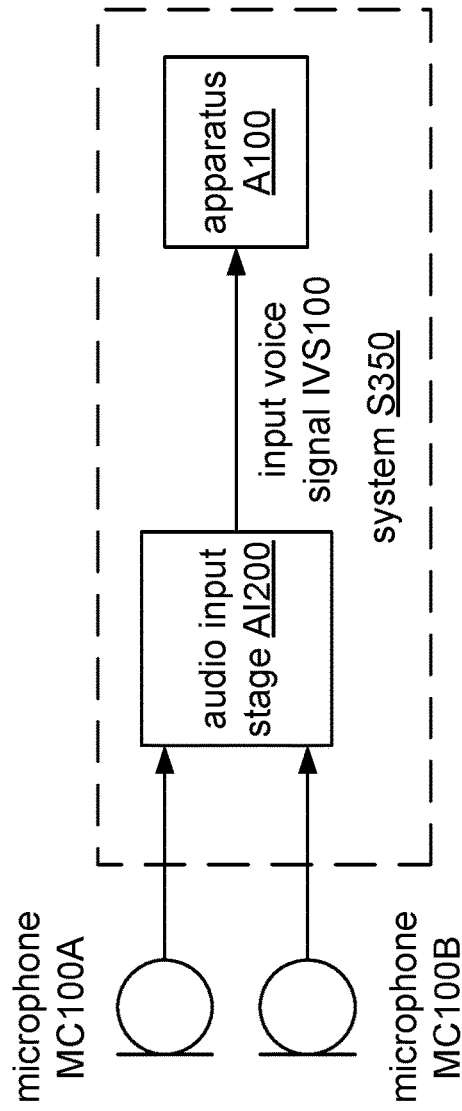
FIG. 3C shows a block diagram of a system S350 that includes an implementation AI200 of audio input stage AI100 and an instance of apparatus A100.

It may be desirable for the operations performed by audio input stage AI100 on the microphone output signal (or signals) to include one or more noise suppression operations. FIG. 3C shows a block diagram of an implementation S350 of system S300 that includes an instance of apparatus A100 and an implementation AI200 of audio input stage AI100 that receives input from instances MC100A and MC100B of microphone MC100. Audio input stage AI200 is configured to perform a spatially selective processing operation (e.g., a directionally selective processing operation, such as beamforming) on the microphone output signals received from the various microphones. Such an operation may help to reduce interference from a reproduced audio signal by directing a beam toward the source of the desired sound component (e.g., the user's mouth) and/or directing a null beam toward the source of the interference (e.g., the loudspeaker reproducing the audio content from encoded media signal EMS100). In a typical implementation, audio input stage AI200 is configured to perform the spatially selective processing operation on the microphone output signals in a digital domain (e.g., downstream of an analog-to-digital conversion operation). Although the example shown in FIG. 3C includes two microphones MC100A and MC100B, it will be understood that system S350 may be implemented to receive and process input from an arbitrary number of microphones (e.g., three, four, five, six, or more).

Figure 4A:
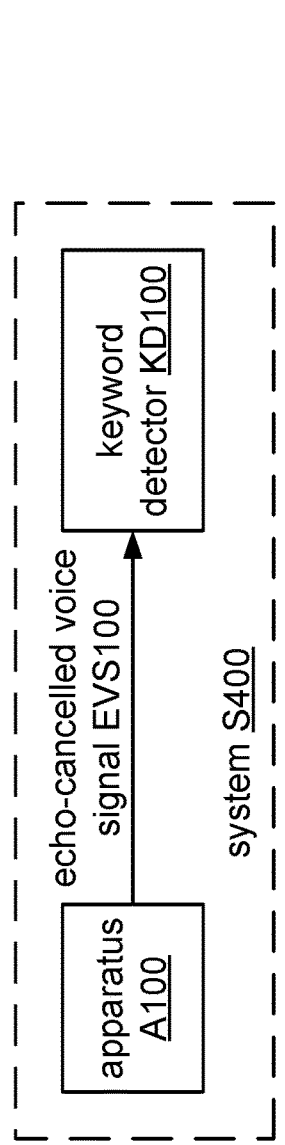
FIG. 4A shows a block diagram of a system S400 that includes a keyword detector KD100 and an instance of apparatus A100.

As noted above, it may be desirable to use echo-cancelled voice signal EVS100 as a voice signal for cellular telephony. Apparatus A100 may be implemented, for example, within a cellular telephone (e.g., a smartphone) and arranged to provide echo-cancelled voice signal EVS100 to a transceiver of the telephone for cellular telephony (e.g., as a near-end signal). Alternatively or additionally, it may be desirable to use echo-cancelled voice signal EVS100 as input to a system for voice content response. FIG. 4A shows a block diagram of such a system S400 that includes an instance of apparatus A100 and a keyword detector KD100 that is arranged to receive echo-cancelled voice signal EVS100. Keyword detector KD100 is configured to detect at least one predetermined keyword in echo-cancelled voice signal EVS100. Keyword detector KD100 may be implemented, for example, to extract feature vectors from echo-cancelled voice signal EVS100 and process them using one or more hidden Markov models (HMMs), Gaussian mixture models (GMMs), and/or neural networks (NNs).

Figure 4B:
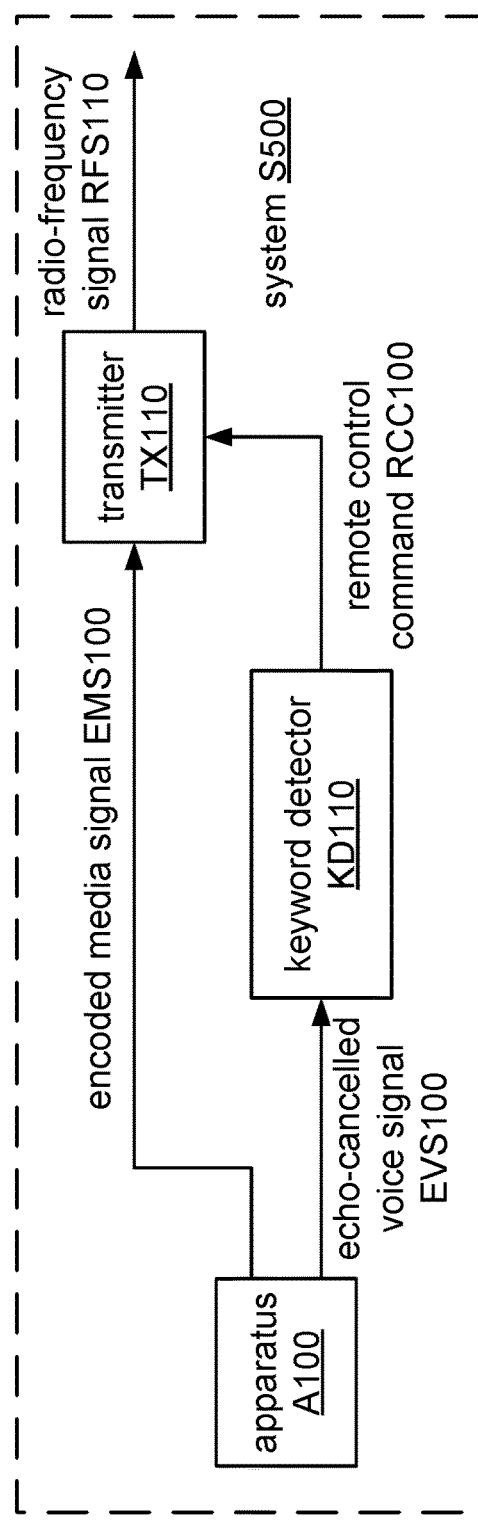
FIG. 4B shows a block diagram of an implementation S500 of system S400 that includes an implementation KD110 of keyword detector KD100 and an implementation TX110 of transmitter TX100.

Keyword detector KD100 is configured to process echo-cancelled voice signal EVS100 to recognize one or more of a limited vocabulary of keywords (e.g., a vocabulary having a size in the range of from one, two, five or ten to twenty, twenty-five, thirty, or fifty words). Such a vocabulary may be sufficient, for example, to support a desired limited control functionality while enabling keyword detector KD100 to have a sufficiently low power budget to remain "always-on" during use of a device within which system S400 is implemented (e.g., a smartphone or smart speaker). In one example, keyword detector KD100 is configured to process echo-cancelled voice signal EVS100 to recognize words relating to a limited set of remote control functions. FIG. 4B shows a block diagram of an implementation S500 of systems S200 and S400 that includes an implementation KD110 of keyword detector KD100 and an implementation TX110 of transmitter TX100. Keyword detector KD110 is configured to produce a remote control command RCC100 in response to detection of one or more corresponding predetermined keywords (e.g., 'volume up') within echo-cancelled voice signal EVS100, and transmitter TX110 is configured to include the command in an implementation RFS110 of radio-frequency signal RFS100. In one example, transmitter TX110 is configured to produce signal RFS110 in accordance with a Bluetooth® AVRCP, Wi-Fi, or other radio-frequency protocol. In another example, a system including apparatus A100 and keyword detector KD110 is configured to transmit remote control command RCC100 as a visible-light or infrared (IR) signal (e.g., a PCM signal in accordance with a protocol such as RC5 (Philips, Amsterdam, NL) or TC101 (NEC Corp., Tokyo, JP)).

Alternatively or additionally, keyword detector KD100 may be configured to process echo-cancelled voice signal EVS100 to recognize one or more "wake words." A "wake word" is a word or short phrase used to activate a system for voice content response. In this case, it may be desirable to arrange keyword detector KD100 to activate one or more other apparatus, devices, or systems upon detecting a "wake word" (e.g., 'OK Google').

Figure 4C:
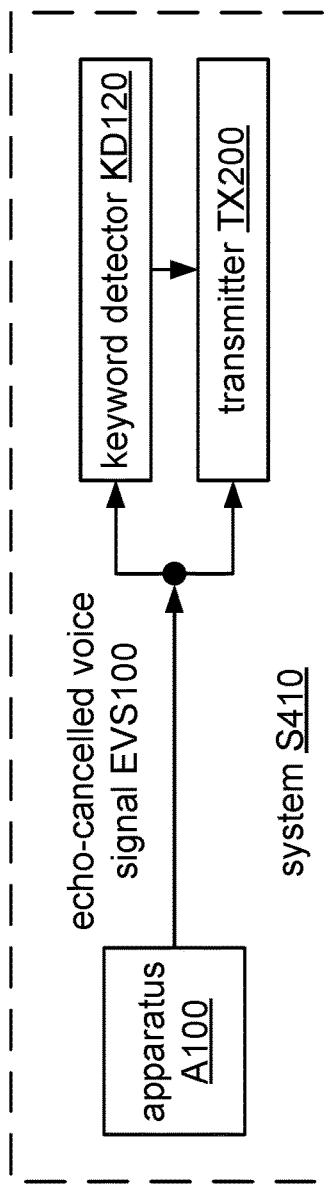
FIG. 4C shows a block diagram of an implementation S410 of system S400 that includes a transmitter TX200 and an implementation KD120 of keyword detector KD100.

FIG. 4C shows a block diagram of an implementation S410 of system S400 that includes a transmitter TX200 arranged to receive echo-cancelled voice signal EVS100 and an implementation KD120 of keyword detector KD100 that is configured to indicate detection of a "wake word." Transmitter TX200 is configured to produce, in response to an indication by keyword detector KD120 that a "wake word" has been detected, a radio-frequency signal that is based on echo-cancelled voice signal EVS100. For example, transmitter TX200 may be configured to transmit echo-cancelled voice signal EVS100 (or features extracted from echo-cancelled voice signal EVS100) over a network connection (e.g., via cellular telephony or Wi-Fi) to an external server for natural language processing. It may be desirable to implement system S410 to buffer echo-cancelled voice signal EVS100 (e.g., using a ring buffer (not shown)) and to implement transmitter TX200 to transmit a portion of the buffered signal (e.g., a portion having a length of two, five, or ten seconds) that includes the detected "wake word." In such case, it may be desirable to implement transmitter TX200 to also transmit indices that indicate the start and end of the detected "wake word" within the portion.

Figure 5A:
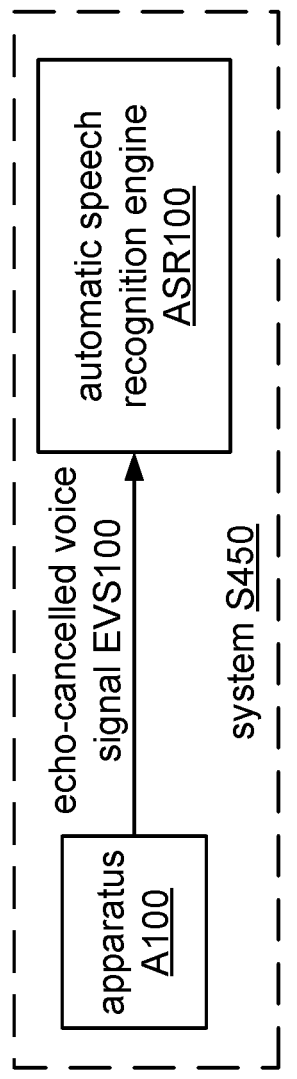
FIG. 5A shows a block diagram of a system S450 that includes an automatic speech recognition engine ASR100 and an instance of apparatus A100.
Figure 5B:
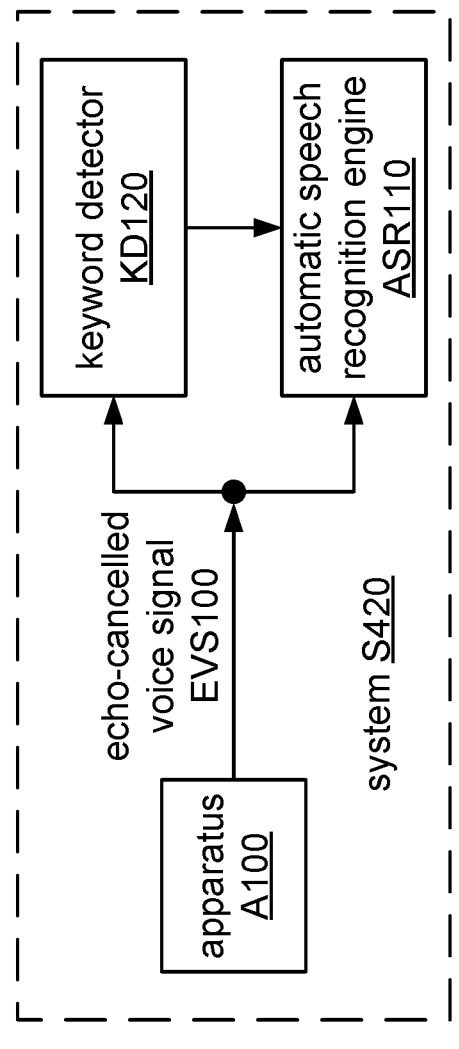
FIG. 5B shows a block diagram of an implementation S420 of systems S400 and S450 that includes an implementation ASR110 of automatic speech recognition engine ASR100 and an instance of keyword detector KD120.

FIG. 5A shows a block diagram of a system S450 that includes an instance of apparatus A100 and an automatic speech recognition engine ASR100 arranged to receive echo-cancelled voice signal EVS100. In contrast to keyword detector KD100, automatic speech recognition engine ASR100 may be configured to support a larger vocabulary (e.g., from one hundred to one thousand or more words) for applications such as geographical navigation, commands associated with lists (e.g., to place a telephone call to a particular contact from a contact list), and/or natural language processing, and consequently an instance of automatic speech recognition engine ASR100 may be expected to consume more power during operation than an instance of keyword detector KD100. FIG. 5B shows a block diagram of an implementation S420 of systems S400 and S450 that includes an implementation ASR110 of automatic speech recognition engine ASR100. In this system, automatic speech recognition engine ASR110 is configured to initiate processing of echo-cancelled voice signal EVS100 (e.g., to wake up) in response to an indication by keyword detector KD120 that a "wake word" has been detected.

Figure 6A:
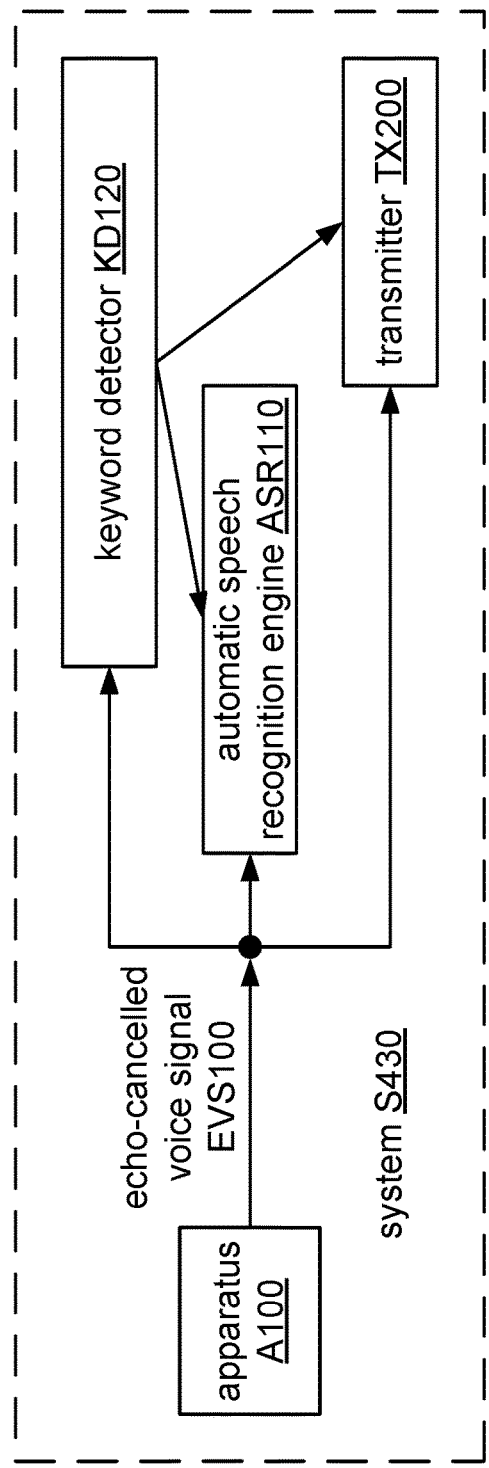
FIG. 6A shows a block diagram of an implementation S430 of systems S410 and S420.

FIG. 6A shows a block diagram of an implementation S430 of systems S410 and S420. In this example, keyword detector KD120 is arranged to indicate detection of a "wake word" to both of automatic speech recognition engine ASR110 and transmitter TX200.

Figure 6B:
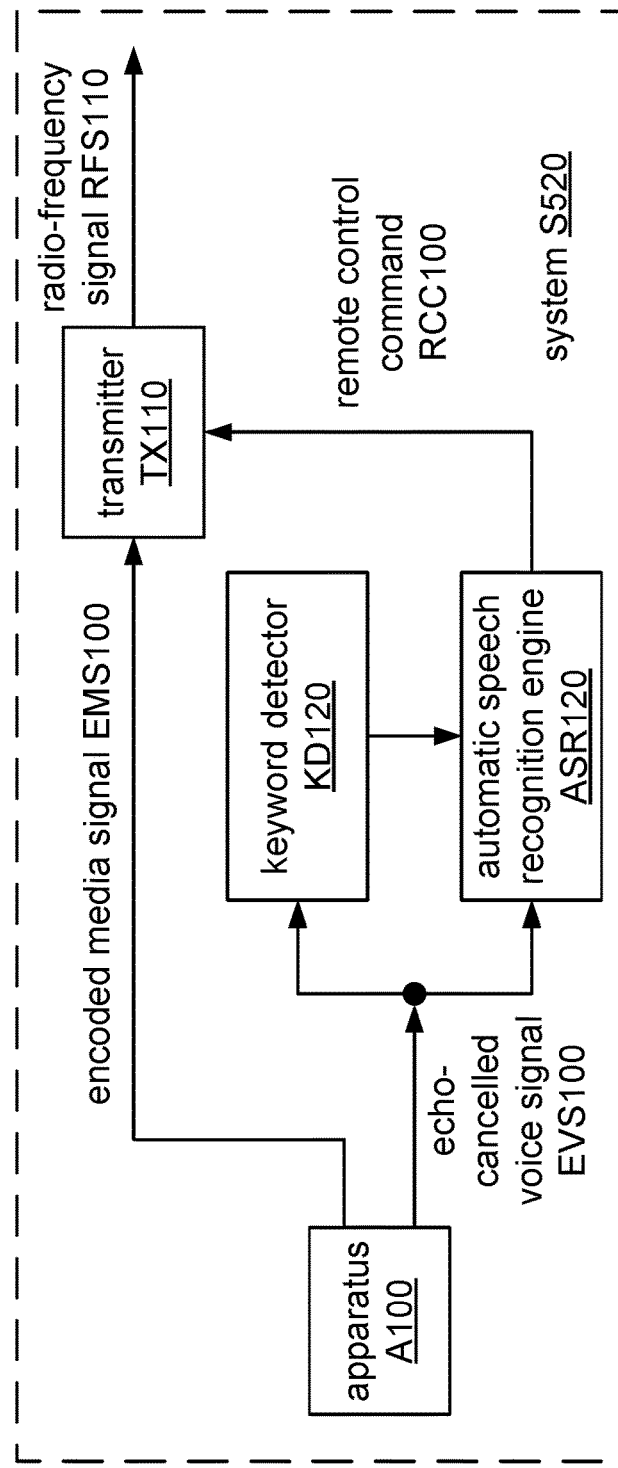
FIG. 6B shows a block diagram of an implementation S520 of systems S420 and S500 that includes an implementation ASR120 of automatic speech recognition engine ASR110.

FIG. 6B shows a block diagram of an implementation S520 of systems S420 and S500 that includes an implementation ASR120 of automatic speech recognition engine ASR110. In this example, automatic speech recognition engine ASR120 is configured to wake up (e.g., activate) in response to an indication by keyword detector KD120 that a "wake word" has been detected, and to produce remote control command RCC100 in response to detection of a corresponding predetermined command word.

Any of systems S100, S150, S200, S300, S350, S400, S410, S420, S430, S450, S500, and S520 may be implemented as (or as a part of) an apparatus, a device, an assembly, an integrated circuit (e.g., a chip), a chipset, or a printed circuit board. In one example, such a system is implemented within a cellular telephone (e.g., a smartphone) or other mobile computing device. Use cases include transmitting encoded media signal EMS100 (or ES100) and/or information from echo-cancelled voice signal EVS100 by such a device (e.g., via a Bluetooth®, Wi-Fi, or other wireless connection as described herein) to an audio system (e.g., an infotainment system) of an automobile or other vehicle or to a smart speaker (e.g., a home speaker or virtual assistant). In another example, such a system is implemented within a smart speaker.

Figure 7:
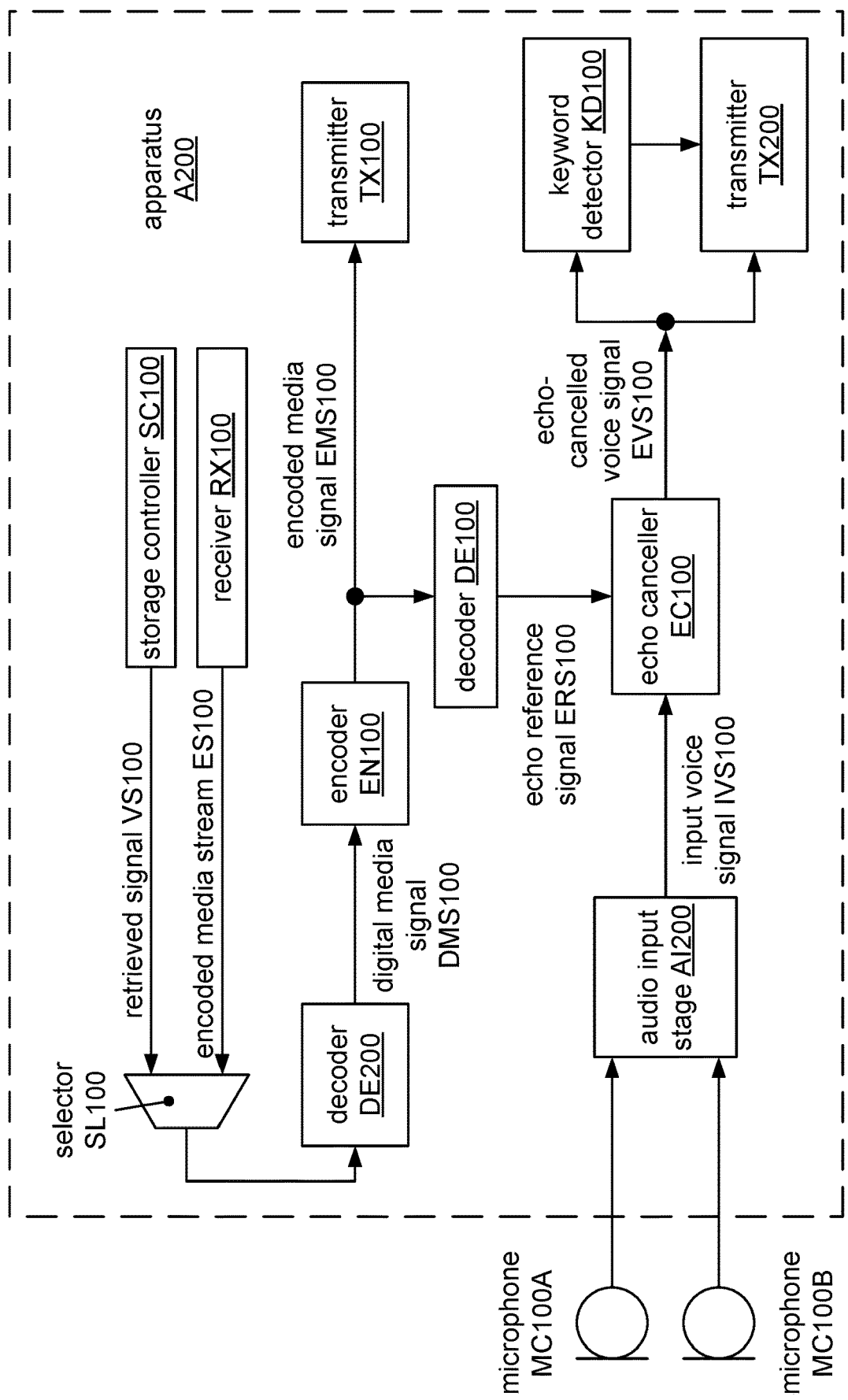
FIG. 7 shows a block diagram of an implementation A200 of apparatus A100.

Moreover, any of the implementations of systems S100, S150, S200, S300, S400, and S500 as described herein may be combined, and all such combinations are contemplated and hereby disclosed. For example, FIG. 7 shows a block diagram of an implementation A200 of apparatus A100 that includes an implementation of each of systems S100, S150, S200, S300, and S400. Apparatus A200 also includes a selector SL100 arranged to select a source of the input to decoder DE200 (e.g., as indicated by a user interface).

Figure 8A:
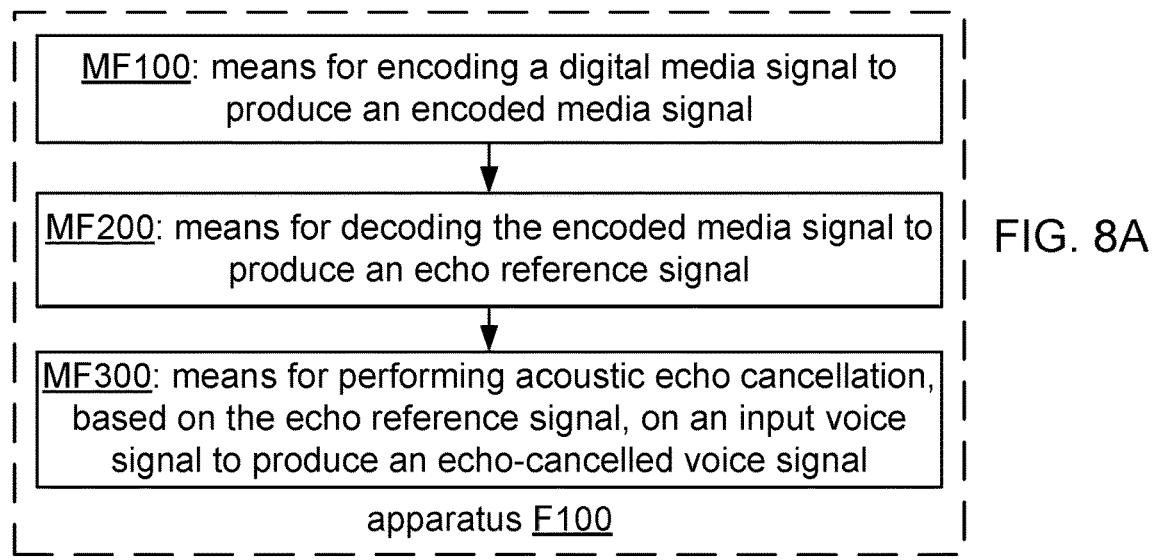
FIG. 8A shows a block diagram of an apparatus F100 according to a general configuration.

FIG. 8A shows a block diagram of an apparatus F100 according to a general configuration that includes means MF100 for encoding a digital media signal to produce an encoded media signal (e.g., as described herein with reference to encoder EN100), means MF200 for decoding the encoded media signal to produce an echo reference signal (e.g., as described herein with reference to decoder DE100), and means MF300 for performing an acoustic echo cancellation operation, based on the echo reference signal, on an input voice signal to produce an echo-cancelled voice signal (e.g., as described herein with reference to echo canceler EC100). Means MF300 includes means for reducing, relative to an energy of a voice component of the input voice signal, an energy of a signal component of the input voice signal that is based on audio content from the encoded media signal (e.g., as described herein with reference to echo canceler EC100). In one embodiment, an integrated circuit includes means MF100, means MF200, and means MF300. Alternatively or additionally, means MF300 may be arranged to receive the input voice signal based on an output of a microphone.

Figure 8B:
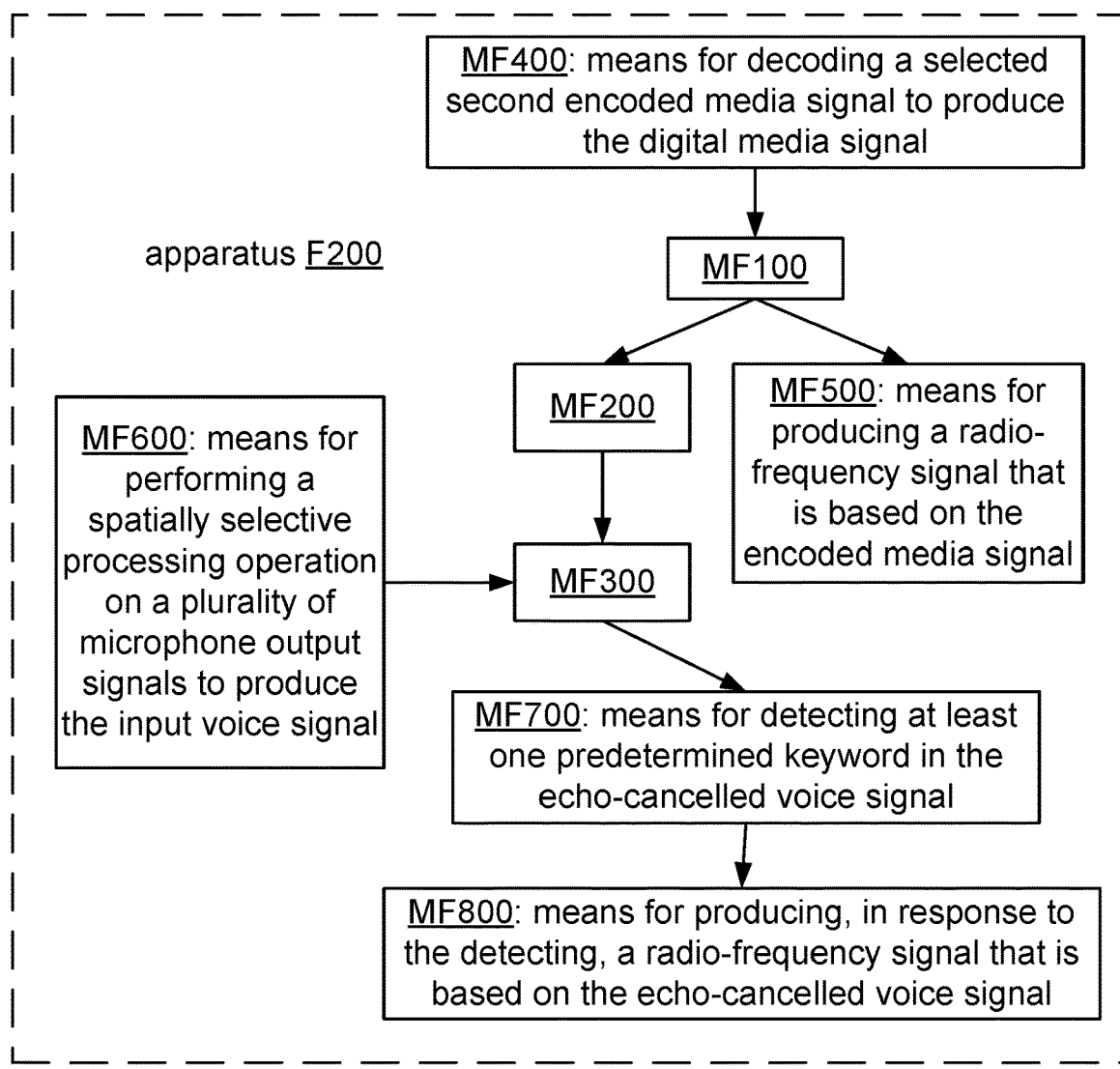
FIG. 8B shows a block diagram of an implementation F200 of apparatus F100.

FIG. 8B shows a block diagram of an implementation F200 of apparatus F100 that includes means MF400 for decoding a selected second encoded media signal to produce the digital media signal (e.g., as described herein with reference to decoder DE200, possibly coupled to means for processing a radio-frequency signal to produce the second encoded media signal, e.g., as described herein with reference to RX100), means MF500 for producing a radio-frequency signal that is based on the encoded media signal (e.g., as described herein with reference to transmitter TX100), means MF600 for performing a spatially selective processing operation on a plurality of microphone output signals to produce the input voice signal (e.g., as described herein with reference to audio input stage AI200), means MF700 for detecting at least one predetermined keyword in the echo-cancelled voice signal (e.g., as described herein with reference to keyword detector KD100), and means MF800 for producing, in response to the detecting, a radio-frequency signal that is based on the echo-cancelled voice signal (e.g., as described herein with reference to transmitter TX200).

Figure 9A:
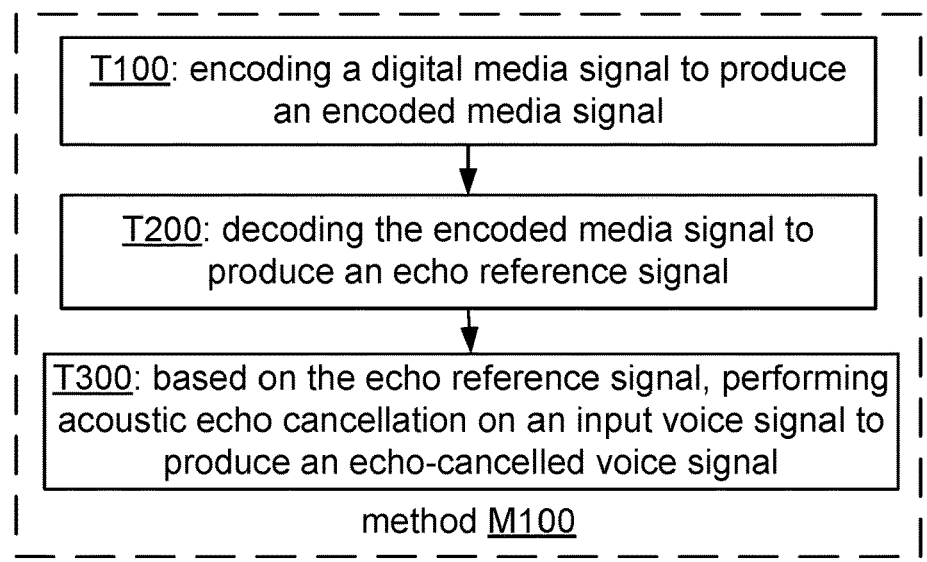
FIG. 9A shows a flowchart of a method M100 according to a general configuration.

FIG. 9A shows a flowchart of a method M100 according to a general configuration that includes tasks T100, T200, and T300. In this method, task T100 encodes a digital media signal to produce an encoded media signal (e.g., as described herein with reference to encoder EN100), task T200 decodes the encoded media signal to produce an echo reference signal (e.g., as described herein with reference to decoder DE100), and task T300 performs an acoustic echo cancellation operation, based on the echo reference signal, on an input voice signal to produce an echo-cancelled voice signal (e.g., as described herein with reference to echo canceler EC100). In this method, the input audio signal includes a voice component and a signal component that is based on audio content from the encoded media signal, and an energy of the voice component, relative to an energy of the signal component that is based on audio content from the encoded media signal, is greater in the echo-cancelled voice signal than in the input voice signal.

Figure 9B:
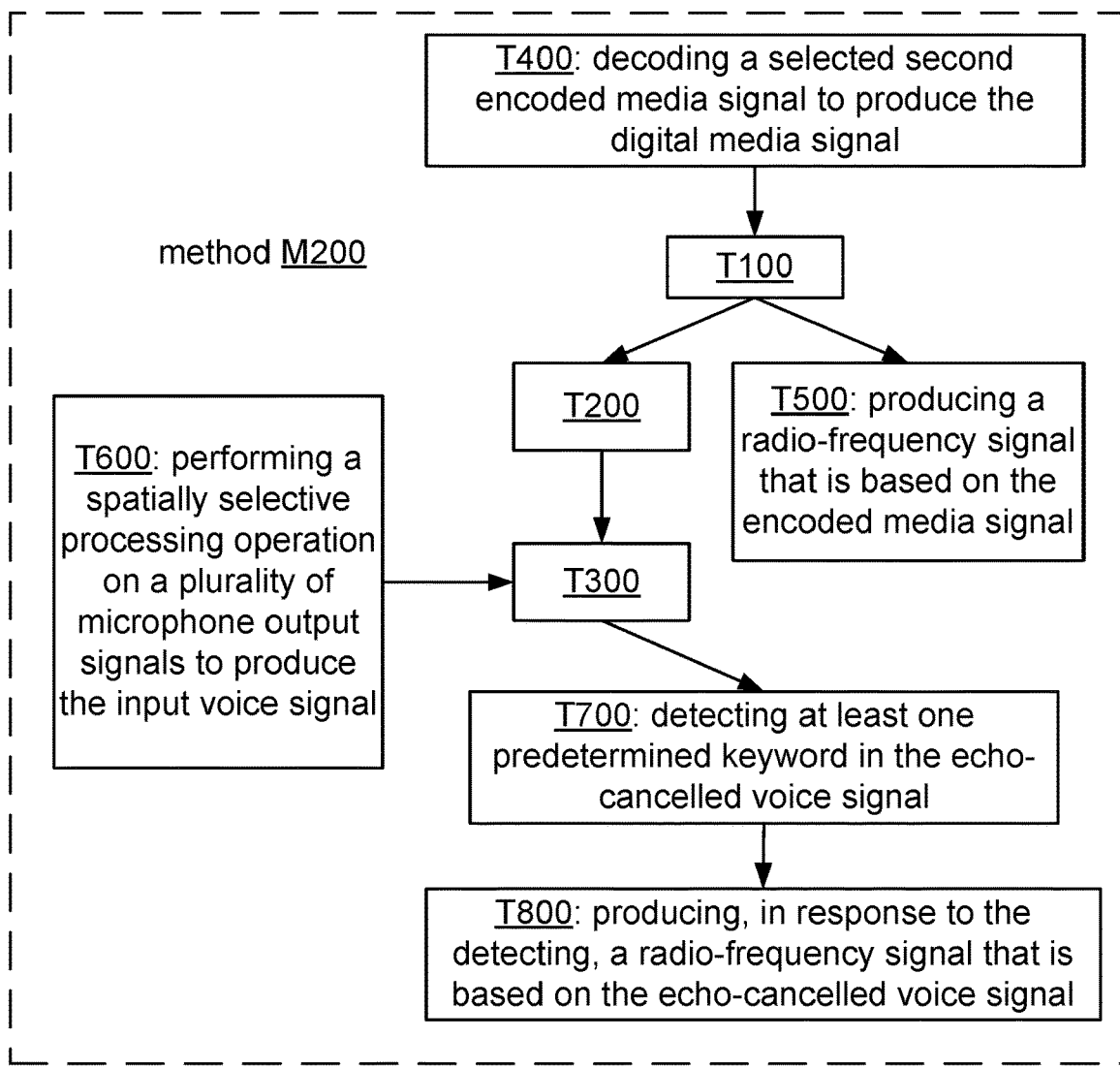
FIG. 9B shows a flowchart of an implementation M200 of method M100.

FIG. 9B shows a flowchart of an implementation M200 of method M100 that includes a task T400 that decodes a selected second encoded media signal to produce the digital media signal (e.g., as described herein with reference to decoder DE200), a task T500 that produces a radio-frequency signal that is based on the encoded media signal (e.g., as described herein with reference to transmitter TX100), a task T600 that performs a spatially selective processing operation on a plurality of microphone output signals to produce the input voice signal (e.g., as described herein with reference to audio input stage AI200), a task T700 that detects at least one predetermined keyword in the echo-cancelled voice signal (e.g., as described herein with reference to keyword detector KD100), and a task T800 that produces, in response to the detecting, a radio-frequency signal that is based on the echo-cancelled voice signal (e.g., as described herein with reference to transmitter TX200).

The various elements of an implementation of an apparatus or system as disclosed herein (e.g., apparatus A50, A100, A200, F100, or F200; system S50, S100, S150, S200, S300, S350, S400, S410, S420, S430, S450, S500, or S520) may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M200 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method of echo cancellation as described herein. Further examples of such a storage medium include a medium further comprising code which, when executed by the at least one processor, causes the at least one processor to cause a radio-frequency signal that is based on the encoded media signal to be produced, wherein the signal component that is based on audio content from the encoded media signal is also based on audio content from the radio-frequency signal (e.g., as described herein with reference to transmitter TX100 and task T500); a medium further comprising code which, when executed by the at least one processor, causes the at least one processor to perform a spatially selective processing operation on a plurality of microphone output signals to produce the input voice signal (e.g., as described herein with reference to audio input stage A1200 and task T600); a medium further comprising code which, when executed by the at least one processor, causes the at least one processor to cause processing of a radio-frequency signal to produce an encoded media stream, and to perform decoding of the encoded media stream to produce the digital media signal (e.g., as described herein with reference to decoder DE200 and task T400); a medium further comprising code which, when executed by the at least one processor, causes the at least one processor to perform detecting at least one predetermined keyword within the echo-cancelled voice signal (e.g., as described herein with reference to keyword detector KD100 and task T700, the medium possibly further comprising code which, when executed by the at least one processor, causes the at least one processor to cause, in response to the detecting the at least one predetermined keyword, a radio-frequency signal that is based on information from the echo-cancelled voice signal to be produced, e.g., as described herein with reference to transmitter TX200 and task T800).

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus for echo cancellation comprising:
a processor configured to:
receive an encoded media signal from a first device;
decode the encoded media signal to produce an echo reference signal;
perform an acoustic echo cancellation operation, based on the echo reference signal, on an input voice signal to produce an echo-cancelled voice signal, wherein the acoustic echo cancellation operation is configured to reduce, relative to an energy of a voice component of the input voice signal, an energy of a signal component of the input voice signal that is based on audio content from the encoded media signal; and
transmit a command based on the echo-cancelled voice signal to the first device.

2. The apparatus of claim 1, wherein the encoded media signal is received via a radio-frequency signal, and wherein the radio-frequency signal further comprises a first remote control command.

3. The apparatus of claim 1, further comprising a transmitter, wherein the processor is configured to transmit the command to the first device via the transmitter.

4. The apparatus of claim 3, further comprising a microphone arranged to sense an acoustic voice signal, wherein the input voice signal is based on an output of the microphone.

5. The apparatus of claim 1, wherein the apparatus comprises a vehicle that includes the processor.

6. The apparatus of claim 1, further comprising a keyword detector configured to detect at least one predetermined keyword within the echo-cancelled voice signal, wherein the command is generated based on the at least one predetermined keyword.

7. The apparatus of claim 1, wherein the apparatus comprises a device for cellular telecommunications that includes the processor.

8. A method comprising:
receiving an encoded media signal from a first device;
decoding the encoded media signal to produce an echo reference signal;
based on the echo reference signal, performing acoustic echo cancellation on an input voice signal to produce an echo-cancelled voice signal, wherein the input voice signal includes a voice component and a signal component that is based on audio content from the encoded media signal, and wherein an energy of the voice component, relative to an energy of the signal component that is based on audio content from the encoded media signal, is greater in the echo-cancelled voice signal than in the input voice signal; and
transmitting a command based on the echo-cancelled voice signal to the first device.

9. The method of claim 8, further comprising performing a spatially selective processing operation on a plurality of microphone output signals to produce the input voice signal.

10. The method of claim 8, wherein the encoded media signal is received via a first wireless signal, and wherein the command is transmitted via a second wireless signal.

11. A non-transitory computer-readable storage medium comprising, instructions that when executed by a processor causes the processor to:
receive an encoded media signal from a first device;
decode the encoded media signal to produce an echo reference signal; and
based on the echo reference signal, perform acoustic echo cancellation on an input voice signal to produce an echo-cancelled voice signal, wherein the input voice signal includes a voice component and a signal component that is based on audio content from the encoded media signal, and wherein an energy of the voice component, relative to an energy of the signal component that is based on audio content from the encoded media signal, is greater in the echo-cancelled voice signal than in the input voice signal; and
transmit a command based on the echo-cancelled voice signal to the first device.

12. A vehicle comprising:
a processor configured to:
   receive an encoded media signal from a first device;
   decode the encoded media signal to produce an echo reference signal; and
   perform an acoustic echo cancellation operation, based on the echo reference signal, on an input voice signal to produce an echo-cancelled voice signal, wherein the acoustic echo cancellation operation is configured to reduce, relative to an energy of a voice component of the input voice signal, an energy of a signal component of the input voice signal that is based on audio content from the encoded media signal.

13. The vehicle of claim 12, wherein the processor is further configured to transmit a command based on the echo-cancelled voice signal to the first device.

14. The vehicle of claim 12, wherein the first device comprises a mobile telephone.

15. The vehicle of claim 13, wherein the command instructs the first device to place a telephone call.

16. The vehicle of claim 13, wherein the command is associated with a geographical navigation application.

17. The vehicle of claim 12, further comprising an audio system, wherein the encoded media signal corresponds to an audio signal to be played back by the audio system.

18. The vehicle of claim 17, wherein the audio system is included in an infotainment system of the vehicle.

19. The vehicle of claim 12, wherein the vehicle corresponds to an automobile.

20. The vehicle of claim 12, further comprising one or more microphones coupled to the processor and configured to generate the input voice signal.

* * * * *